United States Patent
Fischmann

(10) Patent No.: US 12,454,468 B2
(45) Date of Patent: *Oct. 28, 2025

(54) DUAL METHOD AND SYSTEM FOR THE LOW-COST ELIMINATION OF SUSPENDED PARTICLES FROM A BODY OF WATER TO MAINTAIN WATER QUALITY SUITABLE FOR DIRECT CONTACT RECREATIONAL ACTIVITIES

(71) Applicant: Crystal Lagoons Technologies, Inc., Miami, FL (US)

(72) Inventor: Fernando Fischmann, Miami, FL (US)

(73) Assignee: CRYSTAL LAGOONS TECHNOLOGIES, INC., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 19/174,448

(22) Filed: Apr. 9, 2025

(65) Prior Publication Data

US 2025/0282647 A1    Sep. 11, 2025

Related U.S. Application Data

(63) Continuation of application No. 18/590,426, filed on Feb. 28, 2024, now Pat. No. 12,338,139.

(51) Int. Cl.
  *C02F 1/00* (2023.01)
  *C02F 1/68* (2023.01)
  *C02F 1/76* (2023.01)
  *C02F 103/00* (2006.01)
  *C02F 103/42* (2006.01)

(52) U.S. Cl.
  CPC ............ *C02F 1/008* (2013.01); *C02F 1/004* (2013.01); *C02F 1/685* (2013.01); *C02F 1/76* (2013.01); *C02F 2103/007* (2013.01); *C02F 2103/42* (2013.01); *C02F 2209/11* (2013.01)

(58) Field of Classification Search
None
See application file for complete search history.

(56) References Cited

U.S. PATENT DOCUMENTS

| | | | | |
|---|---|---|---|---|
| 2005/0139530 A1* | 6/2005 | Heiss | ............ | C02F 9/00 210/257.2 |
| 2015/0344339 A1* | 12/2015 | Taniguchi | ............ | C02F 9/00 210/638 |
| 2022/0363564 A1* | 11/2022 | Martin | ............ | C02F 1/004 |

* cited by examiner

*Primary Examiner* — Richard C Gurtowski
(74) *Attorney, Agent, or Firm* — Merchant & Gould P.C.

(57) ABSTRACT

A dual method and system for eliminating suspended particles from artificial bodies of water possessing a minimum surface area of 10,000 m² is provided. A permanent substandard centralized filtration flow is utilized together with a Chromo-Turbidity Index (CTI) below about 19. The CTI is maintained by introducing an effective amount of a CTI-Decreasing Agent. Other agents can also be introduced.

16 Claims, 7 Drawing Sheets

DUAL METHOD AND SYSTEM FOR THE LOW-COST ELIMINATION OF SUSPENDED PARTICLES FROM A BODY OF WATER TO MAINTAIN WATER QUALITY SUITABLE FOR DIRECT CONTACT RECREATIONAL ACTIVITIES

PRIORITY

This application is a Continuation of U.S. patent application Ser. No. 18/590,426, filed on Feb. 28, 2024, the entire contents of which are incorporated herein by reference.

FIELD OF THE INVENTION

The present invention is directed to aquatic facilities management and treatment, and more particularly to a dual method and system designed to eliminate suspended particles from a large body of water, the dual method and system including adjusting the Chromo-Turbidity Index (CTI) to establish and maintain the visual and physical properties of the large body of water within levels that achieve an aesthetic appearance and safe condition for direct contact recreational activities.

BACKGROUND

In recent years, the popularity of water-based recreational activities, including swimming and various aquatic sports has grown, with a steadily increasing demand for facilities and environments that can support such water-based activities in a safe and sanitary manner. For instance, an independent study found that the participation in outdoor swimming in the United Kingdom saw an increase ranging from 1.5 to 3 times between 2019 and 2020. Similarly, numerous countries across the Mediterranean, Southeast Asia, South America, North America and Europe have witnessed a boom in the construction of beachfront lagoons and water parks, reflecting the escalating demand for aquatic recreational venues.

However, there is a relevant distinction as to the development and/or use of natural water bodies and man-made water bodies for direct contact recreational purposes. The most common of the man-made type being swimming pools, with artificial water bodies such as swimming pools being limited in achievable size due to costs and other technical difficulties.

Natural water bodies, such as natural lakes and ponds, while serving as evident locations for such recreational pursuits, pose inherent challenges. These bodies rely on natural treatment systems and processes, such as biological equilibrium, to maintain water quality.

The result is that such natural water features are generally murky or have high turbidity, posing a safety risk to bathers. Also, these systems sometimes fail to maintain water quality suitable for direct contact purposes from a sanitary perspective, particularly during contamination or eutrophication events. Moreover, natural water bodies present various sanitary hazards that pose significant health risks. One of the more concerning threats is the presence of pathogenic microorganisms, including amoebae. These single-celled organisms, such as *Naegleria fowleri*, are often found in warm freshwater environments and can lead to severe and often fatal infections when they enter the human body, typically through the nasal passages. Cases of primary amoebic meningoencephalitis (PAM), a brain infection caused by this amoeba, are almost always fatal. Other amoebae can cause skin and eye infections, further underscoring the need for water quality control.

Given these challenges related to the use of natural water features, recently the market is shifting toward the creation of crystal-clear man-made lagoons, specifically designed to facilitate direct contact recreational activities like swimming, as well as the practice of aquatic sports. The treatment and filtering of such bodies of water remains an obstacle, as conventional swimming pool technology is neither suitable nor viable to provide solutions for larger-than-average water features at a low cost—mainly due to how conventional swimming pools are built and operated around the world.

Conventional swimming pool technologies require intensive filtration of the entire water volume, typically at a rate of 4 times per day. This requires comprehensive and efficient filtration, ensuring that every section of the water is uniformly filtered. The filtration includes withdrawing the water from the pool, sending it to a filtration system, and returning it to the swimming pool. In consequence, conventional swimming pools tend to have a large number of outlets and inlets, from which water is withdrawn and returned to the pool respectively, and which also serve the purpose of properly mixing the water volume. A key challenge associated with these methods is the "dead zones" or areas within pools where water remains relatively static, thereby failing to undergo filtration. Such zones, marked by a lack of significant water movement or mixing, can become repositories for contaminants, sediment, or even facilitate biological proliferation, thereby posing health risks to users. Therefore, a large number of inlet and outlet elements must be included in conventional swimming pools to avoid this issue. However, this requirement further increases the costs.

For large man-made lagoons, the adaptation of traditional swimming pool technology becomes increasingly difficult. More critically, achieving homogeneous filtration across these vast expanses is exceptionally challenging. Given their size, if constructed in a manner similar to conventional swimming pools, these lagoons would necessitate a vast array of evenly distributed outlets and inlets, ensuring uniform water mixing and minimizing dead zone formation. Establishing such a network would require intricate, expansive and extensive piping systems, capable of handling long distances, thereby increasing the susceptibility to pressure drops and necessitating high-flow pumps. These intricacies underline a number of operational difficulties and drawbacks:

Energy Consumption: Continuous recirculation and filtration of water in large bodies of water demands robust pumps, leading to elevated energy costs.

Infrastructure: The need for large-scale filtration units, pumping units, and other related equipment results in higher initial and maintenance costs.

Manpower: Ensuring consistent water quality across such expansive areas demands a larger workforce for monitoring, maintenance, and potential troubleshooting.

Equipment Degradation: The constant circulation of powerful pumps can accelerate equipment degradation, leading to more frequent replacements or repairs.

Construction Complexity: The high number of nozzles and the requirement for intricate piping networks, their anchoring, head loss, and others significantly complicate the construction process. This complexity necessitates meticulous planning and execution to ensure stability and functionality, leading to increased construction time and costs.

Furthermore, the complexities associated with traditional centralized filtration, such as nozzle costs, pressure drops, and challenges in achieving uniform filtration, contribute to soaring equipment and operational expenses. In large-scale lagoons, such as a 3-hectare body of water intended for recreational activities, the challenges of proper water circulation and filtration are magnified. For instance, in many regions, regulations stipulate specific nozzle numbers and distribution patterns based on the water surface area to ensure consistent water movement and optimal filtration. Local regulations of California, USA, for instance, specify that there should be a minimum of two inlets for the initial 10,000 gallons (37,850 L) capacity and an additional inlet for each subsequent 10,000 gallons (37,850 L) or fraction thereof. For a 3-hectare (7.41 acre) lagoon, the requirement translates to the need for an initial two inlets plus an additional 1,187 inlets, thus, requiring a total of approximately 1,189 nozzles.

Also, the turnover rate, which is the time taken to circulate and filter the entire volume of the lagoon, is a crucial parameter in lagoon design. For public pools, a standard turnover rate of 6 hours is commonly adhered to. For a 3-hectare (7.41 acre) lagoon with an estimated average depth of 1.5 meters (4.9 feet), the total volume is about 45,000 cubic meters (1,589,160 cubic feet). Therefore, factoring in the capacity of conventional commercial sand filters for swimming pools, which manage approximately 100 m³/hour (3,531 cubic feet/hour), the design would require incorporating about 75 of such filters operating concurrently.

Considering the intricacies of large-scale recreational lagoon construction and the associated infrastructure, costs can be very high. As a reference, conventional swimming pool technology for construction is estimated at about $1,800 per square meter ($167 per square foot). This figure includes the costs related to nozzles, piping, filtration equipment, and other essential components.

In sum, these calculations underscore the complexity and investment required in the design and establishment of large man-made lagoons, highlighting the need for innovative solutions that can address both the technical and financial challenges inherent to such projects.

In consequence, there are currently no large water bodies built nor operated with the use of conventional swimming pool filtration given its high costs and operational difficulties. Past attempts to build such large scale facilities are exemplified by instances like the closure of the Ocean Dome park pool in China in 2007, due to unsustainable costs and operational hurdles. While there are large water bodies for recreational purposes that achieve good transparency and water quality, such features do not use conventional swimming pool technology but instead use techniques such as flocculation and have intensive bottom cleaning requirements, which sometimes causes sediment accumulation on the bottom of such features and puts strain on their treatment, which consequently leads to a deterioration of its aesthetic quality.

Therefore, the use of conventional swimming pool technology has not been an alternative for these large recreational water features, and there is a necessity of providing a technology to eliminate suspended particles from large bodies of water to generate high transparency, providing recreation-suitable water that achieves sanitary standards for swimming, and that are economically viable compared to the use of conventional swimming pool technology.

SUMMARY

The present invention comprises a dual method for the elimination of suspended particles from a man-made body of water having a minimum surface area of 10,000 m², the method comprising:

a. maintaining a permanent sub-standard centralized filtration flow in the man-made body of water.
b. maintaining a Chromo-Turbidity Index (CTI) below 19 by introducing an effective amount of a CTI-Decreasing Agent using a CTI-Decreasing Agent dosing system, to lower the CTI by altering the water's physicochemical or biological characteristics; wherein "CTI-Decreasing Agent" is any agent or combination of agents capable of causing a decrease in the CTI of the water, where:
  i. the ability of an agent or combination of agents to qualify as an "CTI-Decreasing Agent" is determined by its "Decay Index";
  ii. the Decay Index represents the required minimum percentage drop in the CTI over a specified period of time;
  iii. agents or combinations of agents meeting or surpassing a Decay Index of 90% per hour are thereby recognized as CTI-Decreasing Agents;
and wherein the Chromo-Turbidity Index (CTI) of the body of water is defined by the mathematical formula:

$$CTI = \frac{100}{21} \times (\text{Numeric Color} + \text{Turbidity Level}).$$

Furthermore, the present invention comprises a system for adjusting the properties of a body of water of 10,000 m² minimum surface area with base permanent filtration flow, the system comprising:
a. An agent introduction module configured to release an effective amount of a CTI-Decreasing Agent into the body of water if the Chromo-Turbidity Index (CTI) is over 19, wherein the CTI-Decreasing Agent is chosen to lower the CTI by altering the water's physicochemical or biological characteristics; and wherein the CTI of the body of water is defined by the following mathematical formula:

$$CTI = \frac{100}{21} \times (\text{Numeric Color} + \text{Turbidity Level}).$$

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
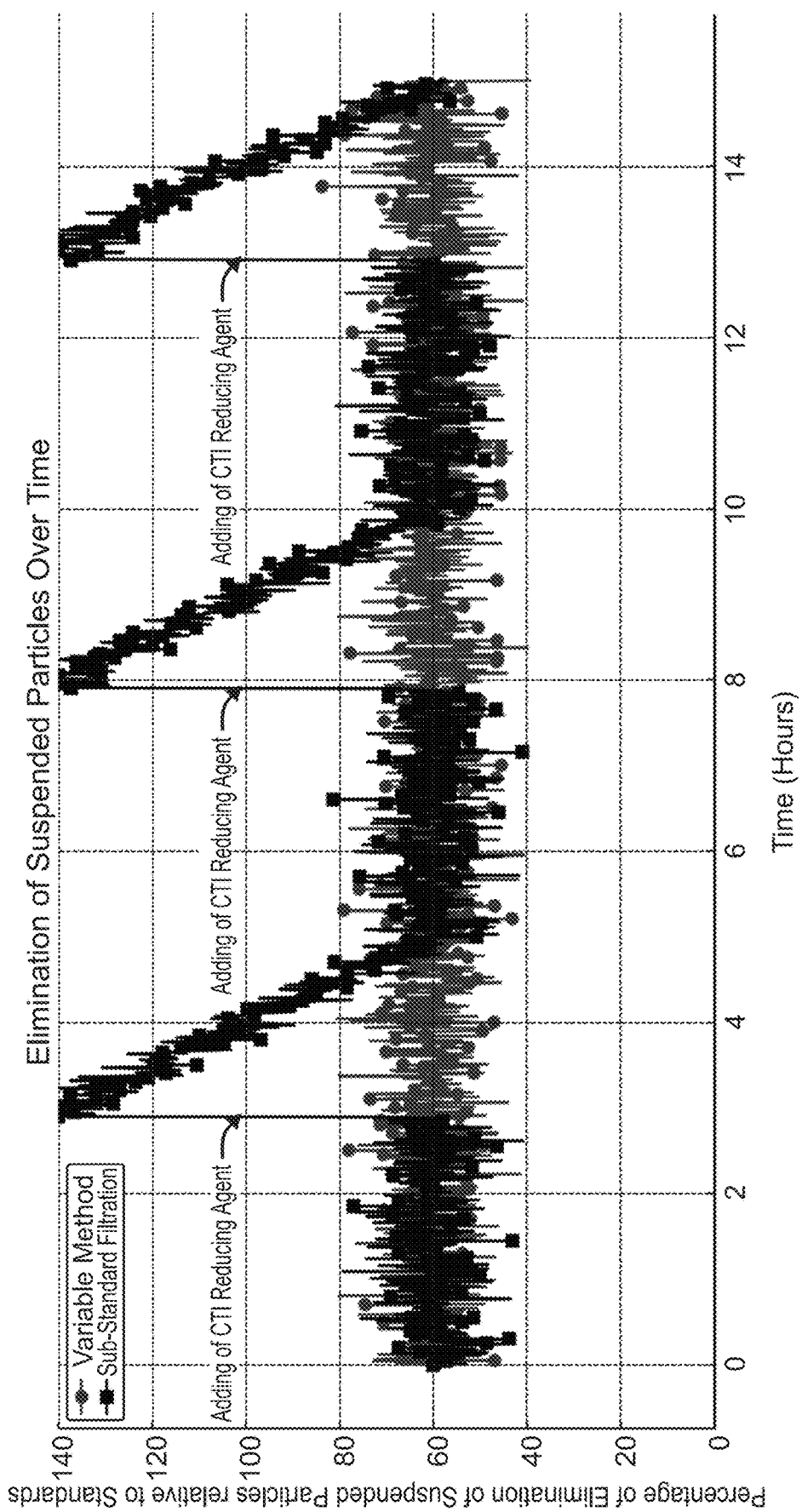
FIG. 1 is a chart illustrates the percentage of elimination of suspended particles utilizing conventional, centralized filtration compared with the dual variable system and method in accordance with embodiments of the present invention.

Reference will now be made in detail to exemplary aspects of the present disclosure that are illustrated in the accompanying drawings. Wherever possible, the same reference numbers will be used throughout the drawings to refer to the same or like parts.

The present application relates to the provision of a dual system and a method to remove suspended solids from a large water body that uses a combination of a base sub-standard permanent filtration flow, along with the use of additional systems that depend on a novel index that quantifies the color and turbidity characteristics of the water body. This index is hereinafter referred to herein as the "Chromo-Turbidity Index", "C-T Index", or "CTI".

The Chromo-Turbidity Index, or CTI, comprehensively assesses the aesthetic conditions of a water body, moving beyond the constraints of evaluating color or turbidity in isolation. Singularly, color or turbidity parameters can yield misleading insights about the water quality. For instance, a water body can be clear, suggesting low turbidity, but its color could be off, indicating the presence of undesirable substances. Conversely, a water body with appropriate color might possess high turbidity levels, obscuring its contents and presenting potential health risks. Likewise, it is possible to encounter scenarios where the levels of either turbidity or coloration individually satisfy the acceptable standards. However, when these factors are assessed collectively utilizing the Chromo-Turbidity Index (CTI), then the combined effect may determine that the water quality is unacceptable.

In order to overcome the shortcomings of a sub-standard permanent filtration, the method of the present invention introduces a CTI-decreasing agent which when combined utilizing the Chromo-Turbidity Index provides for significantly improved water quality. By using the sub-standard filtration and both the Chromo-Turbidity Index and CTI-decreasing agent together, it is possible to eliminate suspended particles more effectively, addressing the limitations of using sub-standard filtration on its own.

This approach represents a significant innovation in water treatment technology. By synergistically combining sub-standard centralized filtration with CTI-decreasing agent treatment, the present system and method introduces a novel solution that substantially enhances water quality and safety. The ability to exceed target levels of particle removal consistently and reliably addresses a critical need in the field of water quality management. This innovation is particularly impactful as it provides a practical and effective solution to the challenges posed by inadequate filtration systems, a common issue in many water features.

The novel CTI method synergizes both color and turbidity evaluations, providing a more accurate understanding of the water's suitability for recreational purposes. By considering these two parameters in tandem, it is possible to identify water conditions that might go unnoticed when evaluating them individually. The integrated approach ensures that the water maintains an appealing visual quality while adhering to strict health and safety standards. The result provides a significant improvement in the field of water treatment, harnessing the power of data-driven insights to deliver both aesthetic allure and safety in large lagoons and other large water bodies.

Turning now to FIG. 1, a graph showing the percentage (i.e., in relation to the level of elimination of suspended particles required to meet the threshold CTI) of sub-standard centralized filtration compared with the method in accordance with the present invention. The graph depicts the efficacy of sub-standard centralized filtration in eliminating suspended particles from water. Since the sub-standard centralized filtration uses a lower number and/or a less distributed network of nozzles and has a lower effective filtration rate (as explained further below), the percentage in relation to the standard via such sub-standard filtration fluctuates, but most of the time remains consistently below the required levels for suspended particle removal, which corresponds to 100%. This underlines the inadequacy of relying solely on sub-standard centralized filtration for maintaining water quality, as it fails to achieve the desired level of particle removal.

However, introducing a CTI-decreasing agent treatment into maintenance of the water significantly alters the outcome. When the sub-standard centralized filtration is combined with the use of CTI-decreasing agent treatment, there is an improvement in the efficacy of eliminating suspended particles that achieves the desired levels and results. The graph illustrates a considerable increase in the removal rate of suspended particles, reaching values surpassing the target level of 100% for important durations. This synergy between sub-standard centralized filtration and CTI-decreasing agent treatment provides a solution for enhancing water quality, where one method compensates for the limitations of the other. By utilizing both approaches concurrently, it is possible to optimize the elimination of suspended particles, overcoming the hurdles posed by the inefficiency of sub-standard centralized filtration alone. This dual system and method demonstrate the potential for achieving more consistent and reliable water purification results, ensuring safer water and mitigating risks associated with inadequate filtration.

The use of the above-described dual system and method, by using a permanent sub-standard centralized filtration along with additional systems, introduces significant improvements in both energy consumption and filtration capacity:

Reduced Electricity Consumption: The water treatment system of the current invention is optimized to consume less electricity. Specifically, tests and operational data indicate that this system utilizes up to 98% less electricity compared to its conventional counterparts. This reduction not only ensures a lower operational cost for the facility owners but also promotes environmental sustainability by decreasing the energy footprint of the water feature.

Optimized Filtration Capacity: In conventional swimming pool systems, the filtration process typically targets the entire volume of pool water, filtering it roughly 4 times per day, and requiring a large amount of inlets and outlets to achieve homogeneous filtration. This repetitive cycling, besides translating into high construction and operational costs, can contribute to excessive wear on the filtration equipment and requires a substantial filtration capacity. In stark contrast, the present invention significantly curtails this demand. This means that, even while ensuring optimal cleanliness, the system is more sustainable, requires less maintenance, and is potentially more durable due to reduced operational demand.

Enhanced Economic Efficiency: Beyond the direct savings from construction costs and reduced electricity consumption, the optimized filtration process can translate to lower overall operational costs. Less frequent replacements of filtration components, reduced maintenance interventions, and potential eligibility for energy-saving rebates or incentives further enhance the economic benefits of the system. In contrast to the high costs associated with conventional pool filtration technologies, the present invention offers a remarkably economical solution, being up to 20 times less expensive. This dramatic reduction in costs has the potential to create a worldwide impact by enabling water bodies of any size to maintain crystal clear water at a fraction of the expense of conventional systems. Such economic efficiency not only broadens the accessibility of high-quality water features but also promotes a sustainable approach in both environmental and financial terms. The innovative nature of this invention could significantly change the management and enjoyment of large water bodies globally, offering a practical, cost-effective solution for pristine water conditions in various settings.

Possibility to Use Different Materials and Reduced Construction Costs: The water treatment system of the current invention may be utilized with water bodies that are constructed with alternative materials, such as plastic liners. This optimized approach eliminates the dependency on concrete for anchoring of nozzles and removes the need for intricate embedding of numerous nozzles in concrete (which is traditionally time-consuming and costly). Therefore, by lowering the number of needed nozzles the construction process is simplified leading to considerably lowered construction costs.

In this context, the present invention embodies a significant step forward in water technologies for large bodies of water. It aligns with modern requirements for energy efficiency and sustainability while ensuring the delivery of clean, clear, and safe water for its users.

Definitional Discussion

Unless otherwise defined, all terms used herein have the same meaning as commonly understood by one of ordinary skill in the art to which this invention belongs. The following terms are intended to be defined as indicated below for the purposes of the present disclosure.

The term "suspended particle" as used herein encompasses a broad spectrum of entities present in water, ranging from visible particulates to microscopic entities, including but not limited to microorganisms and molecular structures. This definition is comprehensive, capturing entities even at the molecular level, such as metals in their non-oxidized form. Suspended particles can originate from various sources and can be composed of organic or inorganic materials. Their presence in water often contributes to its turbidity and color, affecting clarity and aesthetics and potentially its safety for recreational activities.

Biologically-derived suspended particles encompass a spectrum of microorganisms. Algae, for instance, are photosynthetic organisms that can proliferate in water under certain conditions, imparting a tint and turbidity to the water body. Similarly, various bacteria can exist as suspended entities in the water. These microorganisms, while some are harmless, others can pose health risks, especially when water is intended for recreational activities. Protozoa and certain minute aquatic plants and animals also contribute to the biological faction of suspended particles.

In addition to biological entities, suspended particles can comprise inorganic materials. Metals represent a significant component of this category. In particular, the oxidation state of metals plays a pivotal role in determining their behavior and impact on water quality. Metals in their low oxidation states are often more soluble in water compared to their higher oxidation states. This increased solubility means that these metals can remain dissolved in water for longer periods. Aquatic environments, with their dynamic nature, often undergo various redox (reduction-oxidation) changes due to microbial activity or other chemical reactions. Metals in a low oxidation state can participate in these reactions, potentially leading to the transformation of one metal species to another, thereby altering the chemical composition of the water. Furthermore, the toxicity of metals often varies based on their oxidation state. For instance, chromium in its hexavalent form is more toxic than its trivalent counterpart. Examples of this kind of suspended particle include but are not limited to iron, manganese, and copper, which, when present in water, can cause discoloration and, in some cases, health concerns. Over time, metals can react with other substances, resulting in them transitioning from a suspended state to a dissolved one.

Moreover, other suspended particles may derive from external sources, such as soil runoff, which introduces silt and clay into the water. Organic matter, such as leaves and plant debris, can also degrade and fragment into smaller particles, further contributing to the suspended particle load in the water.

The term "sub-standard centralized filtration" refers to a filtration system that falls below established standards for the filtering of the complete water volume per day, or that lacks homogeneity and efficiency according to established parameters. Respectively, this could be due to having smaller filters, of insufficient capacity, or that have insufficient flow rates, or due to having fewer nozzles, and/or having a less distributed network of nozzles that does not allow an effective filtration, and/or that has a lower effective filtration rate, and/or insufficient skimmers. Such sub-standard filtration results in decreased filtration coverage, or a reduction in effective filtration, which is the capacity of the system to eliminate contaminants and suspended particles from the water homogeneously, covering all areas of a body of water instead of only partially. In this scenario, "sub-standard" denotes a departure from the norms of the requirement typically employed in swimming pools to filter the complete water volume 4 times per day, nonetheless having a number of nozzles that are properly distributed to achieve effective filtration of such water volume to a certain level.

On this same note, the lack of homogeneity and efficiency due to lower number of nozzles and/or improper disposition throughout the water volume can be a significant issue. Homogeneity, in this context, refers to the uniform distribution of water throughout the water body, ensuring that every part of it can be filtered or treated. The nozzles are responsible for distributing water, and any lack of homogeneity in this distribution and direction can lead to uneven reach, leaving certain areas untouched dead zones, which can result in the proliferation of contaminants. In this sense, the nozzles play a pivotal role in ensuring an "effective turnover" rate which refers to the frequency at which the entire volume of water in a water body is replaced effectively and homogeneously without leaving untouched areas.

A lower effective turnover can lead to a decrease in water quality, as contaminants have more time to accumulate or proliferate in some areas. Therefore, the lack of homogeneity and efficiency due to the number and/or placement of nozzles, translates into a lower effective turnover, which are critical concerns and addressing these issues is essential for ensuring consistent and high-quality water.

Likewise, a Homogeneity Index of 1 must be met for the turnover to be considered an effective turnover, being defined as: Homogeneity Index (HI)=1 if the difference in the tracker concentration within any 50-cm depth difference is less than or equal to 20% as an average measure performed in three separate locations within the body of water. Otherwise, the HI is 0.

As used herein, the tracker concentration refers to the concentration or value of the tracker used to evaluate the homogeneity of the body of water, which can include, for example, colorant concentration, radioactive isotope measures, visual inspection, assigning a value or category to the concentration of the tracker, among others.

In this sense, the sub-standard centralized filtration refers to two distinct scenarios. First, it can mean that the centralized filtration has a HI=0, which implies a lack of homogeneity and efficiency due to lower number of nozzles and/or improper disposition throughout the water volume compared to 2024 International Swimming Pool and Spa Code (ISPSC). Alternatively, it refers to a centralized filtration that simultaneously possesses a HI=1, and an effective turnover of at most 3 times per day. In this sense this filtration efficiency is equivalent to at most 12.5% the volume of the body of water per hour.

The sub-standard centralized filtration, while differing from traditional high-intensity filtration standards, is intentionally incorporated as a permanent requirement for the present application. This filtration approach creates a unique balance that, when combined with CTI-Decreasing Agent dosing treatment, achieves optimal water quality, clarity, and sanitary conditions. By harmonizing sub-standard centralized filtration with CTI-Decreasing Agent dosing treatment, efficiency is enhanced, as well as leading to reduced energy consumption, equipment wear, and operational costs—all contributing to an improved water treatment solution.

An advantage of the concept and implementations of the present invention is the utilization of a permanent sub-standard filtration, which comprises less turnover and/or a reduced number of nozzles and/or a less distributed network of nozzles. In traditional systems, a higher number of distributed nozzles, typically embedded in the swimming pool's concrete shell, are used to ensure uniform water distribution and filtration. Concrete, being a durable and robust material, provides stability to the nozzles and its piping network, but it also necessitates a more complex, time-consuming, and costly construction process. Furthermore, concrete structures are typically permanent and inflexible, making any subsequent modifications or expansions challenging. The adoption of fewer nozzles and/or a less distributed nozzle network, as proposed by the present invention, allows for a significant departure from this norm, and opens the avenue to using other materials for the pool structure construction.

The term "Turbidity" is defined as the cloudiness or haziness of a fluid caused by large numbers of individual particles suspended in the water volume. In water bodies, turbidity is typically caused by the presence of suspended particles such as silt, clay, microorganisms, and other particulate matter. It is a key test of water quality and can affect the color of the water. To measure turbidity, a turbidimeter or a nephelometer can be used. The results are often reported in Nephelometric Turbidity Units (NTU). However, other measures or methods may be used to measure turbidity or clarity of the water, such as the use of Secchi discs or others.

The term "Numeric color" is defined as a quantitative representation of the coloration of water. This value can be influenced by various substances and particulates in the water, such as organic matter, metals, and other contaminants. The presence of these substances can impart color to the water, which might be indicative of certain water quality issues.

The term "Flocculant" or "Coagulant" is defined as a chemical compound that promotes the clumping together of fine particles suspended in a liquid, resulting in the formation of "flocs", or leading to particle aggregation or clumping.

Dual Approach

The present disclosure provides a method and system for the elimination of suspended particles of a body of water, particularly large bodies with a minimum surface area of 10,000 m$^2$, the method and system having a base sub-standard centralized filtration flow together with the use of at least one additional system to maintain the water's physicochemical properties in order to establish water suitable for recreational purposes.

The dual method and system from the present disclosure, in an innovative manner, comprises the use of a Chromo-Turbidity Index (CTI), as defined herein. The Chromo-Turbidity Index (CTI) mathematical formula represents a groundbreaking advancement, synergistically integrating two pivotal parameters that influence water appearance. It provides a more comprehensive view of the condition of the water. Historically, monitoring these factors in isolation rendered water quality assessments inefficient, leading to unnecessary consumption of resources, excess use of chemical agents, and increased energy expenditure in filtration processes. The CTI approach addresses these inefficiencies, emphasizing the significance of understanding the interplay between water's color and turbidity.

A preferred method in accordance with the present invention comprises:
a. maintaining a permanent sub-standard centralized filtration flow in the man-made body of water; and In order to calculate the CTI, the numeric color of the water and the turbidity level of the water is determined. The Chromo-Turbidity Index (CTI) of the body of water has the following mathematical formula:

$$CTI(\text{Chromo} - \text{Turbidity Index}) = \frac{100}{21} \times (\text{Numeric Color} + \text{Turbidity Level}).$$

The Numeric Color, as used in the CTI, is a quantitative representation of the water's color in Forel-Ule scale and the Turbidity Level, as used in the CTI, represents the clarity of the water in Nephelometric Turbidity Units (NTU).

The numeric color of the body of water is determined by using a colorimetric measure module; the colorimetric measure module allowing to numerically represent the chromatic look of the body of water, determining its deviation from the crystal-clear water to be achieved based on an objective standard. One of the scales to numerically define water color is the Forel-Ule scale, a visual method used primarily in limnology to determine the color of water bodies. The scale ranges from clearest, blue water at number 1 (indicating oligotrophic conditions) to reddish-brown water at number 21 (indicating eutrophic or even dystrophic conditions). The Forel-Ule scale color is determined by comparing the water sample's color with a set of standardized hues, particularly 21 values. Numeric color, as such, provides not only an aesthetic indication but also serves as a useful tool in environmental monitoring and management. The preferred colorimetric measure module to determine the numeric color of the water, according to the present disclosure, comprises the use of the Forel-Ule scale.

Additional methods for determining the numeric color through a colorimetric measure module can be selected from the group consisting of: spectrophotometric technology, which measures the absorbance or transmittance of specific wavelengths of light by the water; colorimetric sensor arrays, employing a series of indicators that change color based on the presence of specific analytes or conditions in the water; reflectance colorimetry, where the color of the water is determined by measuring the reflection of light off the water surface; tintometer methods, which compare the color of the water to known standards; image-based colorimetry, utilizing digital imaging and analysis techniques to ascertain the color quality of the water; integrated optical fiber sensors, which can be immersed into the water body to relay real-time color information; tristimulus colorimetry, which uses three detectors to capture light information in the red, green, and blue regions, mimicking human color perception; obtaining the information from an external source, or any combination thereof.

Further, the turbidity level of the body of water is determined using a turbidity measure module; the turbidity measure module allowing to numerically represent the turbidity of the body of water determining its deviation from the crystal-clear water to be achieved based on an objective standard. The preferred turbidity measure module from the present disclosure comprises the use of nephelometric methods, which measure the intensity of scattered light at a specific angle relative to the incident light, quantifying turbidity in Nephelometric Turbidity Units (NTU).

Additional methods for determining the turbidity level through a turbidity measure module, can be selected from the group consisting of: laser diffraction methods, wherein the size and distribution of particles in the water are determined based on the scattering pattern of a laser beam passing through the water; transmittance methods, where the reduction in light intensity passing straight through a water sample is measured to determine turbidity, backscatter detection, capturing light that is scattered in the direction opposite to the source, allowing for measurements in high turbidity conditions; digital image methods to visually capture and then digitally analyze the clarity of the water; ultrasonic methods, where the speed, attenuation, or scattering of ultrasonic waves passing through the water is analyzed to determine turbidity; Time of Flight (ToF) sensors, which determine the time taken for a light or sound pulse to travel through the water sample and reflect off particles, obtaining the information from an external source, or any combination thereof.

The dual method and system of the present invention also comprises defining a "CTI-Decreasing Agent" as any agent or combination of agents capable of causing a decrease in the CTI of the water in a specific period of time, where:
  the ability of an agent or combination of agents to qualify as an "CTI-Decreasing Agent" is determined by its "Decay Index";
  the Decay Index represents the required minimum percentage drop in the CTI over a specified period of time;
  agents or combinations of agents meeting or surpassing a Decay Index of 90% per hour are thereby recognized as CTI-Decreasing Agents.

The definition of a "CTI-Decreasing Agent" is important to the process of regulating and maintaining the desired appearance and quality of a body of water. It emphasizes the need for not just any agent, but those specifically effective in bringing about a quantifiable reduction in the Chromo-Turbidity Index (CTI).

Furthermore, the "Decay Index" is a standardized metric that facilitates the categorization and qualification of agents. Rather than using subjective or inconsistent criteria, the Decay Index provides a uniform system to assess the effectiveness of various agents. For instance, if two agents—Agent A and Agent B—are considered for CTI reduction, their efficacy can be compared based on their respective Decay Index values. If Agent A has a higher Decay Index than Agent B, it implies that Agent A is more potent or efficient in reducing the CTI of water.

Figure 2:
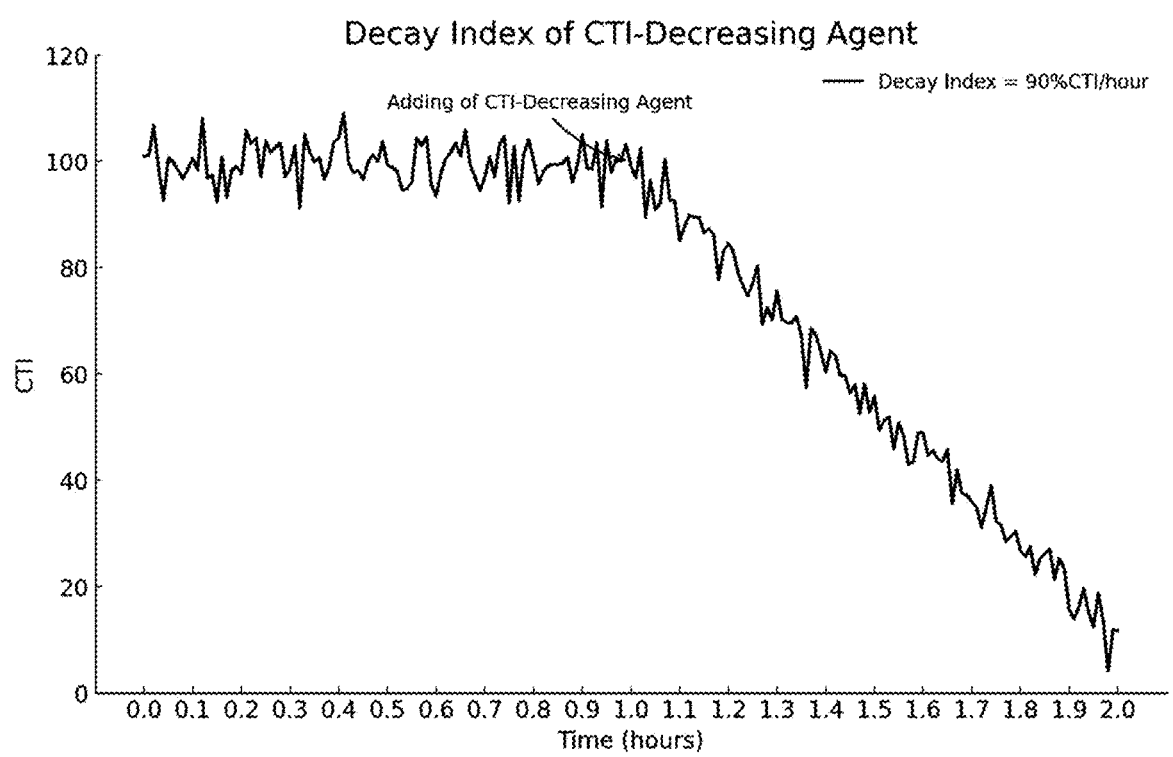
FIG. 2 is a heatmap of the values for the Chromo-Turbidity Index (CTI) in relation to the turbidity and color of a body of water. The area under the curve represents the defined values under the threshold of CTI=19, where the water complies with the required aesthetic and quality requirements.

Representing the required minimum percentage drop in the CTI over a set period ensures that the CTI-Decreasing Agents are not only effective but also efficient. An agent that takes longer to achieve a certain reduction is not desirable as quick adjustments are crucial. This behavior can be observed in FIG. 2, where a basal state of the CTI of the water is followed by a drop in CTI produced by the application of the CTI-Decreasing Agents, as the complying with the minimum definition of 90% CTI reduction per hour (established minimum threshold). By establishing a clear threshold, in this case, 90% per hour, the process ensures that only the top-performing CTI-Decreasing Agents, are utilized. This benchmark ensures consistency and sets a standard of performance.

To illustrate, imagine two CTI-Decreasing Agents: Agent C with a Decay Index of 80% per hour and Agent D with a Decay Index of 95% per hour. As the established minimum threshold is 90% per hour, then Agent D would be recognized as a CTI-Decreasing Agent, while Agent C would not, as it doesn't meet the minimum required performance. In conclusion, these parameters are important for determining the most effective and efficient agents for the job, ensuring that the body of water remains not only aesthetically pleasing but also economically and ecologically managed.

The dual method and system from the present disclosure also comprises maintaining the CTI below about 19 (i.e., the CTI$\leq$19), wherein if it is determined that the CTI is over 19, then the present disclosure includes introducing an effective amount of a CTI-Decreasing Agent using a CTI-Decreasing Agent dosing system to lower the CTI by altering the water's physicochemical and/or biological characteristics.

Figure 3:
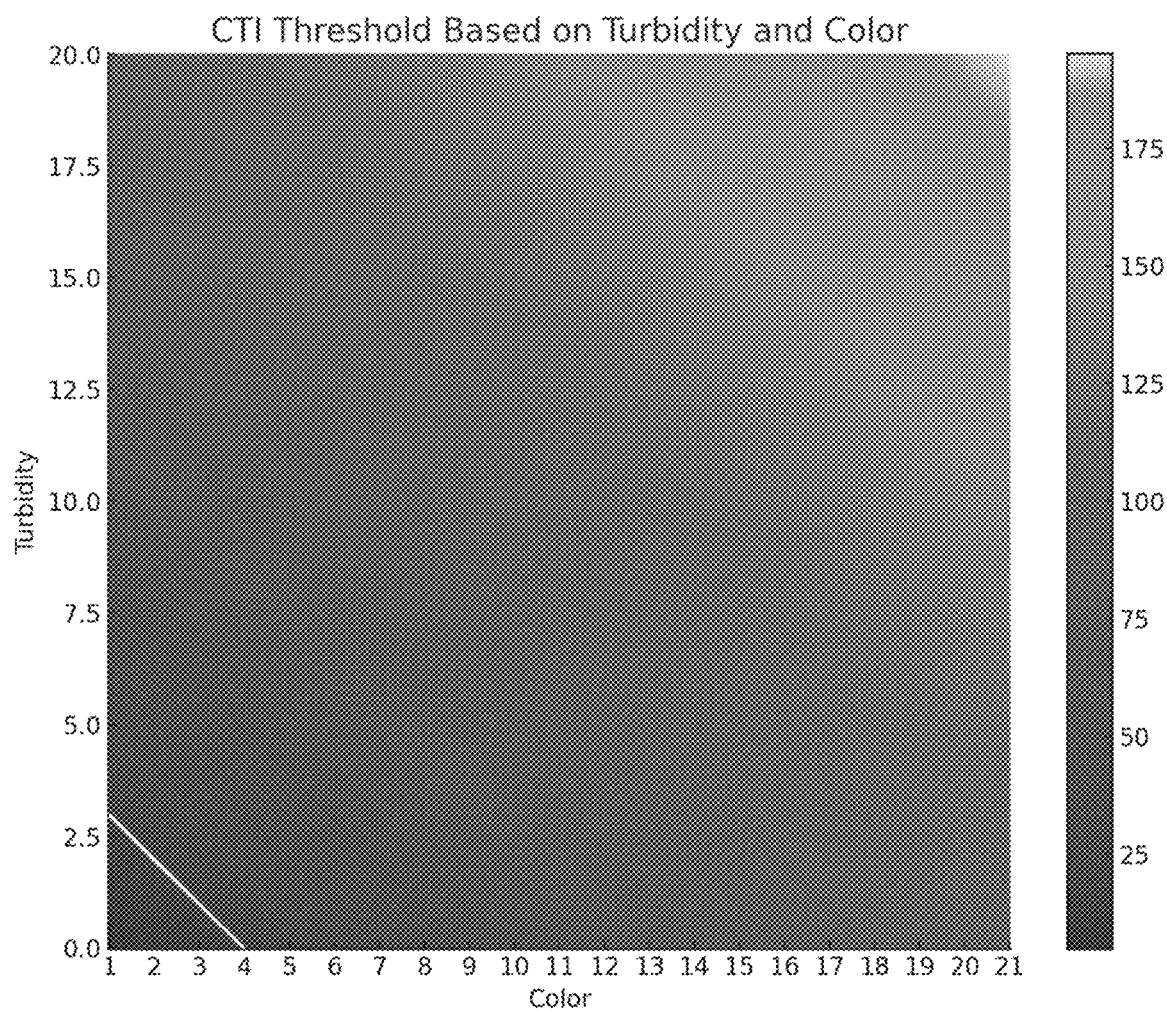
FIG. 3 is a chart that represents the minimal required behavior of a CTI-Decreasing Agent, where after its application a decrease of 90% of the CTI per hour is observed.

The maximum threshold value of the CTI as described herein as corresponding to a maximum value of about 19 acts as a benchmark or reference point. If the CTI surpasses this threshold, it signifies that the water's appearance and quality has deviated from the desired standard. This threshold has been set based on several factors including aesthetic preferences, safety guidelines, and specific use-cases. A representation of this definition is illustrated in FIG. 3, where the values of CTI depending on the turbidity and color of the water can be seen. A curve that surrounds the area of CTI≤19 is shown, representing the group of values where the water complies with the requirements needed to keep the desired aesthetical and/or quality levels.

Figure 4:
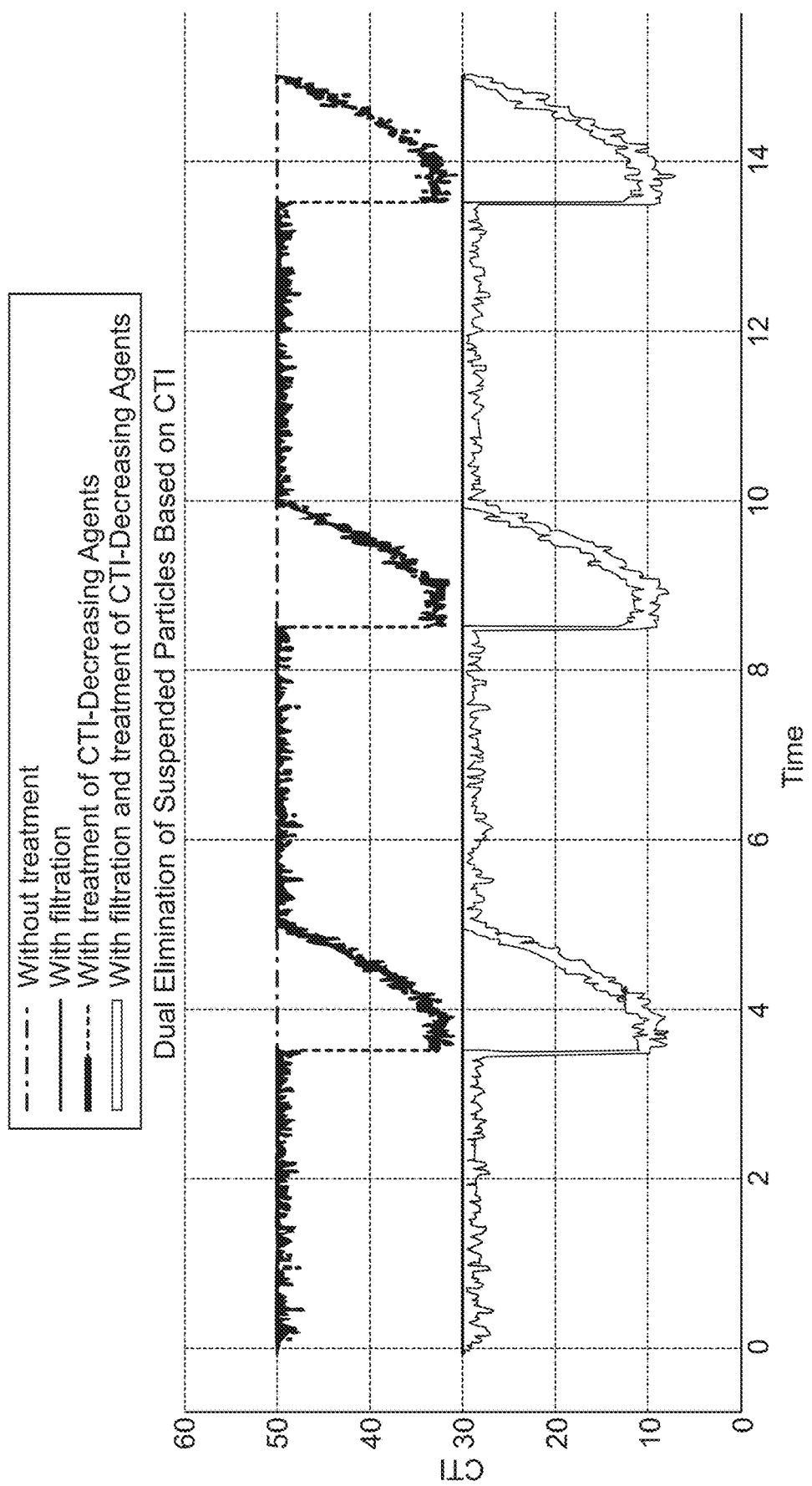
FIG. 4 is a chart that depicts the water CTI during the different combinations of sub-standard centralized filtration and treatment methods of the technology.
Figure 5:
FIG. 5 is a depiction of the man-made body of water of the present invention.
Figure 6:
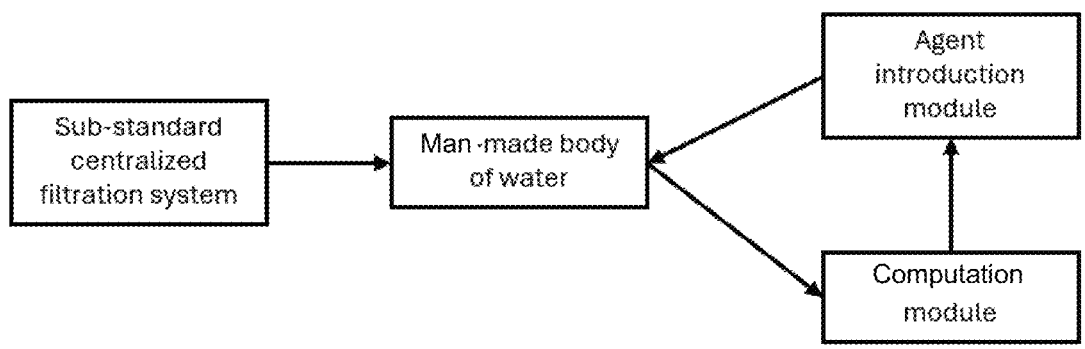
FIG. 6 is a schematic illustration of the interrelation of the components of the dual system according to an embodiment of the present invention.
Figure 7:
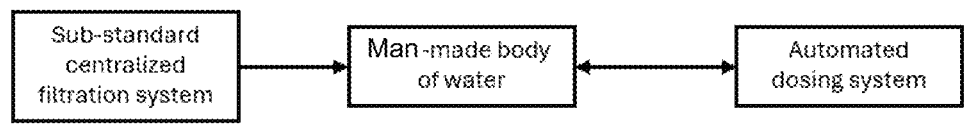
FIG. 7 is a schematic illustration of the interrelation of the components of the dual system according to an embodiment of the present invention.

Furthermore, the use of dual technology is illustrated in FIG. 4, as it combines a base permanent sub-standard centralized filtration flow, that reaches a certain basal CTI range, which can be regulated by the use of additional systems based on the variation of the CTI and if it exceeds its maximum threshold value. By adopting this approach, not only substantial energy savings during filtration are achieved, but also the use of the CTI-Decreasing Agent is fine-tuned, ensuring optimal performance based on CTI values.

Real-time assessments can be made using the dual method and system of the present disclosure. In the event of anomalies or deviations, then immediate corrective actions can be initiated. This monitoring and comparison can reduce the response time, ensuring the water maintains its desired characteristics without long periods of deviation by means of introducing an effective amount of the CTI-Decreasing Agent using a CTI-Decreasing Agent dosing system. In an embodiment of the present disclosure, the step of determining the Chromo-Turbidity Index and comparing the calculated CTI to a threshold of 19 is performed manually. In another embodiment, an automated dosing system or computation module is used for such purpose.

In an embodiment of the present disclosure, the Chromo-Turbidity Index (CTI) is further utilized to monitor environmental changes in the body of water over time, such as increased algal blooms during warmer months or potential pollution events, among others. For instance, the CTI can act as an early warning system for ecological changes like algal blooms. Similarly, the CTI can also be pivotal in recognizing potential pollution events. If, for instance, there's an accidental spill of any kind, the CTI would reflect a sudden spike due to the change in the water's color and turbidity.

In an embodiment of the present disclosure, the CTI-Decreasing Agent is selected from the group consisting of (at least one CTI-Decreasing Agent must be used, including the use of combinations thereof):
  biological agents, including but not limited to microbial species known for their water clarifying properties; enzyme formulations designed to break down specific organic materials contributing to turbidity; natural plant extracts with known water purification properties;
  natural mineral agents, including but not limited to, zeolites, activated carbon, and bentonite clays;
  oxidizing agents, including but not limited to, hydrogen peroxide, ozone, chlorine dioxide; calcium hypochlorite, sodium hypochlorite and potassium monopersulfate;
  chelant agents, including but not limited to, ethylenediaminetetraacetic acid (EDTA), nitrilotriacetic acid (NTA), and diethylenetriaminepentaacetic acid (DTPA);
  pH modifying agents, including but not limited to, sodium hydroxide, hydrochloric acid, sulfuric acid, sodium bicarbonate, and calcium carbonate;
  flocculants and/or coagulants, including but not limited to, polyacrylamides, ferric chloride, alum, aluminum sulfate; ferric sulfate, and polyaluminum chloride;

The selection of the appropriate CTI-Decreasing Agent is closely tied to the specific cause of the coloration and turbidity in the water. In instances where the water presents a high CTI due to the presence of metals, then oxidizing agents like hydrogen peroxide, ozone, or calcium hypochlorite can be applied. Such agents have concentrations typically ranging between 0.1 to 15 ppm, but the exact amount may vary based on the intensity of the coloration. These oxidizing agents react with the metals, converting them into insoluble forms that can be more easily filtered.

When algal blooms are the primary contributors to high CTI, an agent with algicidal properties becomes necessary. Natural plant extracts, or enzyme formulations designed specifically to degrade organic materials causing turbidity, can be introduced. Concentrations usually lie within the 0.1 to 50 ppm range, contingent upon the extent of the algal presence.

For turbidity resulting from bacterial contamination, agents with bactericidal properties, such as microbial species known for their water clarifying properties, are advisable. Here, the concentrations can be anywhere from 0.1 to 100 ppm, depending on the level of bacterial infestation. In cases where natural mineral agents are used, such as zeolites or activated carbon, to address coloration and turbidity, a range of 0.5 to 500 mg/L is typical. However, for stronger agents like bentonite clays, a concentration between 0.2 to 100 mg/L may suffice.

In addition to the agents described above, agents from other categories with bactericidal or algicidal activity may be used. For example, oxidizing agents such as calcium hypochlorite or sodium hypochlorite can be applied between 0.1 to 30 ppm for this purpose.

Chelant agents, like EDTA or NTA, applied to bind with and neutralize metals causing discoloration, are often used in concentrations ranging from 0.1 to 30 ppm. Lastly, when tackling turbidity using flocculants or coagulants, agents like polyacrylamides or ferric chloride can be introduced in concentrations between 0.1 to 25 ppm. These agents cause the fine particulates to bind together, making them large enough to be filtered out efficiently.

In an embodiment of the present disclosure, the Decay Index is determined using a benchmark testing protocol comparing a control sample of water without the CTI-Decreasing Agent to a sample that has been subject to the application of the CTI-Decreasing Agent. Such a comparative approach ensures that the effects of the CTI-Decreasing Agent are quantitatively assessed against a stable reference point. The control sample acts as a baseline, representing the natural state of the water without intervention of a CTI-Decreasing Agent. The baseline provides a clear, unaffected reference against which all changes can be determined. For instance, if the CTI value of a water body is 100, this number serves as the starting point for any subsequent treatment. On the other hand, the sample after having applied the CTI-Decreasing Agent showcases the potential alterations that can be brought about in the water quality. This gives a tangible measure of the effectiveness of the agent. For instance, if after introducing a specific agent into the lagoon water, the CTI value drops to 60, it suggests a 40% decrease in the Chromo-Turbidity Index.

In an illustrative embodiment, consider a scenario wherein a container is filled with 1 liter of algae-contaminated water, exhibiting a CTI value of 40. Subsequently, a CTI-Decreasing Agent is introduced to this water sample. After one hour the CTI of the sample is 2, therefore having a Decay Index of 95% decrease/hour.

In an embodiment of the present disclosure, the method includes a step of continuously or periodically monitoring the CTI after the introduction of the CTI-Decreasing Agent, and re-introducing an effective amount of the CTI-Decreasing Agent as necessary to maintain the CTI below 19. In another embodiment of the present disclosure, the step of introducing an effective amount of the CTI-Decreasing Agent is automatically performed in response to real-time CTI determination. This provides for a method to rapidly modify the properties of the water without delay when needed.

The present disclosure also comprises the use of an agent introduction module configured to release an effective amount of a CTI-Decreasing Agent into the body of water. The agent introduction module is equipped with a dosing system selected from the group comprising: pumps, drip feed systems, venturi injectors, diaphragm metering pumps, powder dissolution systems, ultrasonic dosing systems, injection quills, among others. In an embodiment of the present disclosure, the agent introduction module is equipped with an automated dosing system responsive to CTI determination such as, but not limited to programmable logic controller based systems. This allows for quickly introducing an effective amount of the CTI-Decreasing Agent without delay.

In another embodiment of the present disclosure, the CTI-Decreasing Agent is incorporated into the body of water in combination with other water treatment chemicals, enhancers, or conditioners.

The dual method and system from the present disclosure is applied to a man-made water body selected from the group comprising: freshwater bodies, saline or saltwater bodies, brackish waters, estuaries, artificial reservoirs, lakes, ponds, lagoons, rivers, streams, bays, inlets, coves, channels, fjords, springs, and any combinations thereof. Also, the body of water may be a part of a recreational facility, aquatic park, resort, urban beach entertainment complex, or natural water reserve intended for public or private use.

EXAMPLES

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments disclosed and still obtain a like or similar result without departing from the spirit and scope of the invention.

The examples presented below are prophetic examples. A prophetic example describes an embodiment of the invention based on predicted results. These prophetic examples are provided for illustrative purposes and are not to be construed as limitations of the present invention.

Example 1: CTI-Decreasing Agent Determination

To determine the appropriate CTI-Decreasing Agent and its concentration for addressing elevated Chromo-Turbidity Index (CTI) in large lagoons, in cases when there is no previous information about the suspended particles causing the issue, or about the appropriate CTI-Decreasing Agent to use, a systematic approach is undertaken.

First, the nature of the suspended particles contributing to the elevated Chromo-Turbidity Index (CTI) can be determined to subsequently determine the best CTI-Decreasing Agent. In this context, a multi-faceted experimental approach is undertaken. A representative sample of 1 Liter of the lagoon water is collected. Then, using an optical microscope with capabilities for both transmitted and polarized light microscopy, a drop of the water sample is placed on a microscope slide and examined under varying magnifications. This helps to identify larger particles, such as algae, or other visible contaminants by visual inspection of common features. The presence of characteristic green or blue-green cells would suggest algae, while cloudiness or moving particles could indicate bacteria. Further verification of bacterial or algal presence is done using culture-based assays. Sequential dilutions of the water sample are made and cultured on sterile petri dishes containing agar media specific for different kinds of bacteria and algae. After incubation, the presence of different microorganisms can be determined and quantified, permitting to define the CTI-Decreasing Agent depending of the specific contributions. For detection of metal ions, which can also contribute to water turbidity, equipment like an Atomic Absorption Spectrophotometer (AAS) or Inductively Coupled Plasma Mass Spectrometry (ICP-MS) is utilized. By introducing the water sample into the AAS or ICP-MS, the presence and concentration of various metal ions in the sample can be determined. Elevated levels of metals like iron or copper would suggest metal contamination.

Once the nature of the suspended particles is ascertained, the next step is to conduct a series of experiments to identify the optimal CTI-Decreasing Agent. For metal contaminants, different oxidizing agents, such as hydrogen peroxide, ozone, or calcium hypochlorite, are tested at varying concentrations. The effectiveness of each is evaluated based on the CTI drop they produce after one hour. In cases where microorganism blooms are identified as the primary contributors to the elevated CTI, tests are conducted using different biocides, including natural plant extracts or specific enzyme formulations designed to degrade biological material. The efficiency of each agent is determined by measuring the resulting CTI drop at different concentrations. The desired agent and its concentration are determined by the reduction in CTI they produce. If the CTI remains high post these treatments, further tests are conducted using natural mineral agents, chelant agents, flocculants, or coagulants. Through these rigorous methods, the optimal CTI-Decreasing Agent and its concentration can be identified and applied to ensure the water in large lagoons remains clear and aesthetically pleasing.

In this context, a series of dilutions of potential CTI-Decreasing Agents is prepared, encompassing various concentrations. Each dilution is introduced to separate aliquots of 1 liter of the collected water sample. CTI is determined for each aliquot before and after introducing the potential CTI-Decreasing agent and allowing each aliquot to sit for one hour. The Decay Index for each concentration is then calculated based on the change in CTI values. The Decay Index represents the required minimum percentage drop in the CTI over the specified period. According to the threshold of this invention, agents or combinations of agents that meet or surpass a Decay Index of 90% per hour are determined as CTI-Decreasing Agents.

Specifically, the 1 liter samples of the lagoon water are initially determined with a CTI value of 100 and, after testing with the oxidizing agent, calcium hypochlorite at various concentrations, it is determined that at 10 ppm, the CTI value drops to 9 after one hour, corresponding to a 91% decrease in CTJ. As the Decay Index threshold corresponds to 90% per hour, this oxidizing agent above 10 ppm qualifies as a CTI-Decreasing Agent. Once the optimal agent and concentration are identified in the laboratory, the agent is applied to the lagoon. Upon application in the lagoon, it is essential to continually monitor the CTI to ensure that the desired levels are consistently achieved and to make necessary adjustments in the dosing or application methods as required. Through this method, the optimal CTI-Decreasing Agent and its concentration can be precisely determined and effectively applied to maintain clear and aesthetically pleasing water in large lagoons.

It is important to note that in cases where the suspended particles causing the issue are previously known and so is the appropriate CTI-Decreasing Agent to use and its concentration, then this test is not necessarily required.

Example 2: Dual Method

A large water body spanning an area of 25,000 m² and having a volume 37,500 m³ is fitted with a sub-standard centralized filtration system, designed to manage a flow rate of 91,800 m³/day. As a comparison, a conventional swimming pool filtration system would require a capacity of at least 37,500 m³×4 times/day=150,000 m³/day. This system has a capacity of about 61% of the comparable swimming pool filtration capacity.

Initially, this base system in the large water body struggles to maintain an optimal CTI, staying close to 25, as determined by the Forel-Ule scale and the Nephelometric Turbidity Unit (NTU) measure, revealing its inefficiency in purifying the water to desired levels.

In order to maintain a CTI lower than 19, 20 ppm of calcium hypochlorite (CTI-Decreasing Agent) is introduced into the water, as algae growth was visually identified. This agent is specifically introduced to optimize the removal of suspended particles produced by algae and subsequently reduce the CTI when applied in the current method.

The process begins with a meticulous measurement and precise administration of the agent, ensuring it interacts effectively with the water body. Following the application of the CTI-Decreasing Agent, we observe a notable decrease in the CTI below 19, indicative of a marked improvement in water clarity. This is repeated whenever the CTI rises over 19 again, ensuring a level below 19 (as seen in FIG. 1).

The combination of the CTI-Decreasing Agent and the centralized filtration system successfully transforms the water quality of the large man-made lagoon. The water, initially characterized by elevated CTI levels and sub-optimal filtration, now exhibits a significant increase in clarity and quality, with near-total removal of suspended particles for extended periods, thereby meeting and exceeding the desired standards.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A dual method for the elimination of suspended particles from a man-made body of water, the method comprising:
    a. maintaining a permanent sub-standard centralized filtration flow in the man-made body of water, wherein the permanent sub-standard centralized filtration flow consists of an effective turnover of at most 3 times per day;
    b. maintaining a Chromo-Turbidity Index (CTI) below about 19 by introducing an effective amount of a CTI-Decreasing Agent to lower the CTI by altering the physicochemical or biological characteristics of the water, wherein the CTI-Decreasing Agent is an agent or combination of agents which cause a decrease in the CTI of the water, where:
        i. the ability of an agent or combination of agents to qualify as the CTI-Decreasing Agent is determined by a Decay Index of the CTI-Decreasing Agent;
        ii. the Decay Index represents the required minimum percentage drop in the CTI over a specified period of time; and
        iii. agents or combinations of agents meeting or surpassing a Decay Index of 90% per hour are defined as CTI-Decreasing Agents; and
    a. the CTI of the body of water is defined by the mathematical formula:

$$CTI = \frac{100}{21} \times (\text{Numeric Color} + \text{Turbidity Level}),$$

wherein the numeric color is a quantitative representation of the water's color in Forel-Ule scale and the Turbidity Level represents the clarity of the water in Nephelometric Turbidity Units.

2. The method of claim 1, further comprising monitoring environmental changes in the body of water over time using the Chromo-Turbidity Index (CTI), whereby increased algal blooms and potential pollution events are detected.

3. The method of claim 1, wherein the CTI-Decreasing Agent is selected from the group consisting of biological agents; oxidizing agents; chelant agents; pH modifying agents; flocculants and/or coagulants; or combinations thereof.

4. The method of claim 1, wherein the Decay Index is determined using a benchmark testing protocol comparing a control sample of water without the CTI-Decreasing Agent to a sample with the CTI-Decreasing Agent.

5. The method of claim 1, further comprising the step of continuously or periodically monitoring the CTI after the introduction of the CTI-Decreasing Agent and re-introducing the effective amount of the CTI-Decreasing Agent as necessary to maintain the CTI below about 19.

6. The method of claim 1, wherein the threshold of about 19 is predetermined based on a desired aesthetic appeal or safety standards.

7. The method of claim 1, wherein the Chromo-Turbidity Index is automatically maintained.

8. The method of claim 1, wherein the step of introducing an effective amount of the CTI-Decreasing Agent is automatically performed in real-time.

9. The method of claim 1, wherein the CTI-Decreasing Agent is incorporated into the body of water in combination with other water treatment chemicals, enhancers, or conditioners.

10. The method of claim 1, wherein the man-made body of water is selected from the group consisting of freshwater bodies, saline or saltwater bodies, brackish waters, estuaries, artificial reservoirs, lakes, ponds, lagoons, rivers, streams, bays, inlets, coves, channels, fjords, springs, and combinations thereof.

11. The method of claim 1, wherein the body of water forms part of a recreational facility, aquatic park, resort, urban beach entertainment complex, or natural water reserve.

12. A system for adjusting the properties of a body of water with a base permanent filtration flow, the system comprising:
- a. an agent introduction module equipped with a dosing system and configured to release an effective amount of a CTI-Decreasing Agent into the body of water if a Chromo-Turbidity Index (CTI) is over about 19, wherein the CTI-Decreasing Agent is chosen to lower the CTI by altering the physicochemical or biological characteristics of the water; and
- b. the CTI of the body of water is defined by the following mathematical formula:

$$CTI = \frac{100}{21} \times (\text{Numeric Color} + \text{Turbidity Level}),$$

wherein the numeric color is a quantitative representation of the water's color in Forel-Ule scale and the Turbidity Level represents the clarity of the water in Nephelometric Turbidity Units; and
- c. wherein the system is configured for maintaining a permanent sub-standard centralized filtration flow in the body of water, and the permanent sub-standard centralized filtration flow includes an effective turnover of at most 3 times per day.

13. The system of claim 12, wherein the agent introduction module is equipped with an automated dosing system.

14. The system of claim 12, wherein the CTI-Decreasing Agent is selected from the group consisting of biological agents; oxidizing agents; chelant agents; pH modifying agents; flocculants and/or coagulants; or combinations thereof.

15. The system of claim 12, wherein the body of water is selected from the group consisting of freshwater bodies, saline or saltwater bodies, brackish waters, estuaries, artificial reservoirs, lakes, ponds, lagoons, rivers, streams, bays, inlets, coves, channels, fjords, springs, and combinations thereof.

16. The system of claim 12, wherein the body of water is included in a recreational facility, aquatic park, resort, urban beach entertainment complex, or natural water reserve intended for public or private use.

* * * * *